United States Patent [19]
Gregory

[11] 3,736,800
[45] June 5, 1973

[54] CONTROL UNIT
[75] Inventor: Ted W. Gregory, Mundelein, Ill.
[73] Assignee: Arens Controls, Inc., Evanston, Ill.
[22] Filed: Feb. 12, 1971
[21] Appl. No.: 114,815

[52] U.S. Cl. ..........................74/491, 74/522, 74/525
[51] Int. Cl. ....................................74 526, G05g 1/00
[58] Field of Search........................74/491, 525, 526,
74/522, 511; 192/116.5, 143

[56] References Cited
UNITED STATES PATENTS

| | | | |
|---|---|---|---|
| 1,402,535 | 1/1922 | Page | 74/511 M X |
| 3,352,173 | 11/1967 | Freeland | 74/511 X |
| 1,255,220 | 2/1918 | Petry | 74/525 X |
| 2,108,745 | 2/1938 | Dodd | 74/525 |
| 2,186,620 | 1/1940 | Aprea et al. | 74/526 |
| 2,414,040 | 1/1947 | Hanner | 74/525 |
| 3,530,736 | 9/1970 | Houk | 74/471 X |

Primary Examiner—Milton Kaufman
Attorney—Olson, Trexler, Wolters & Bushnell

[57] ABSTRACT

A lever operated control unit includes two brackets of metal stampings which are adjustably connected together. A lever crank, which is also a metal stamping, is rotatable on a pivot bolt secured to the brackets, and a lever is adjustably mounted on the lever crank. The lever crank is adapted to operate a control member such as a push-pull cable. A rod is pivoted to the lever crank and has stop collars that cooperate with a pivot fitting on one of the brackets to limit the travel of the cable.

9 Claims, 11 Drawing Figures

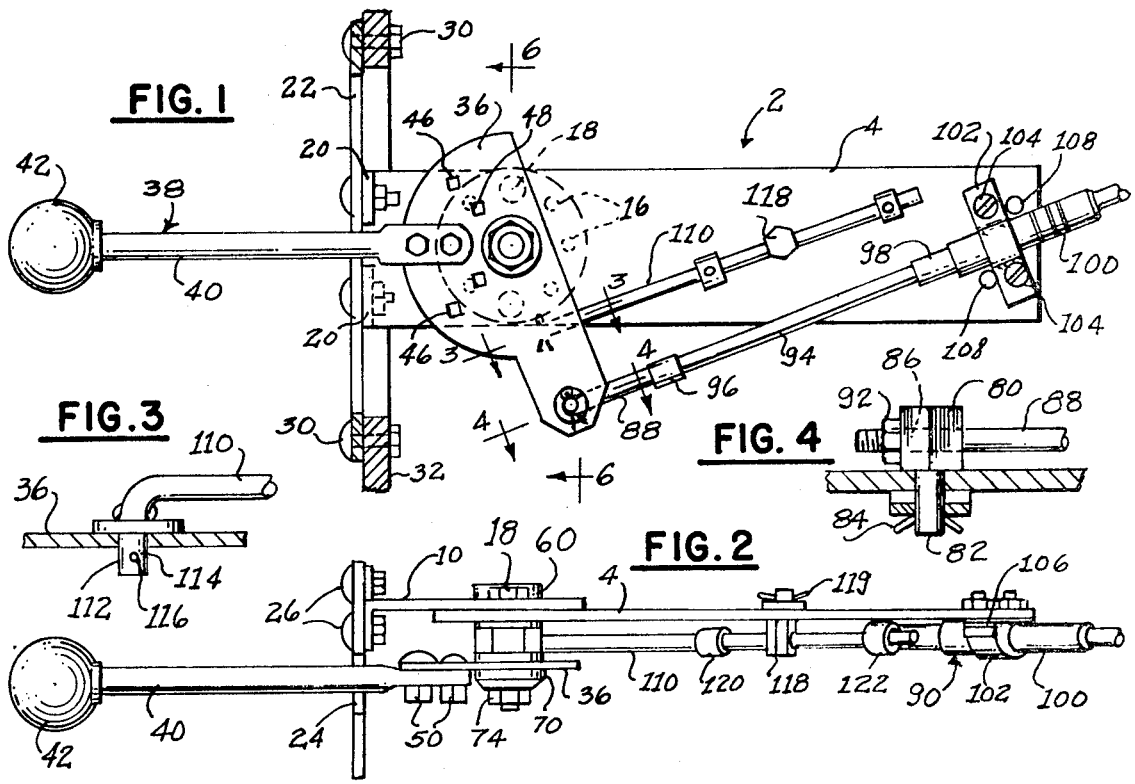
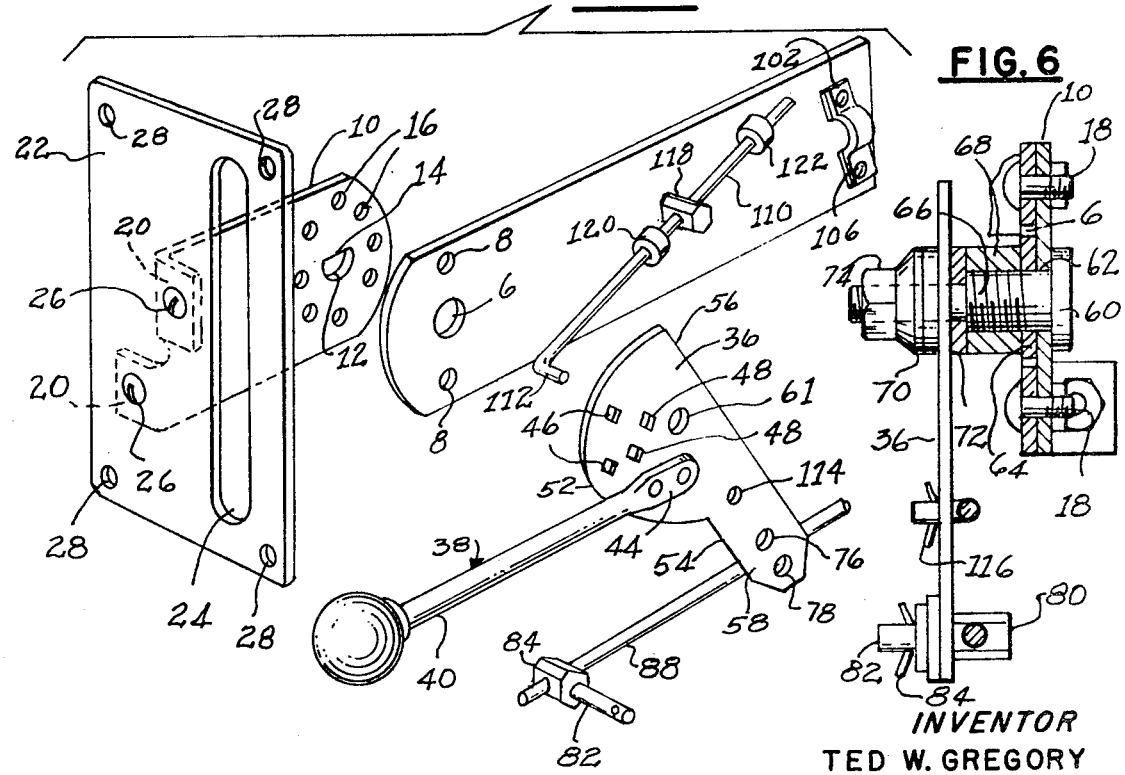

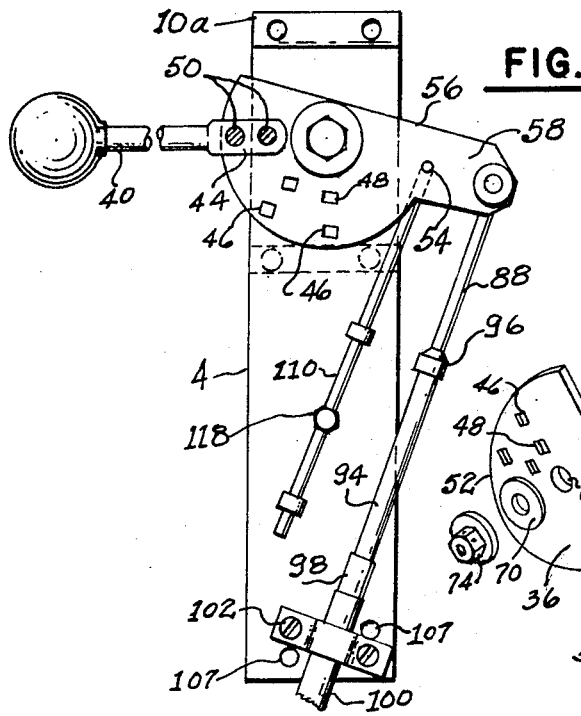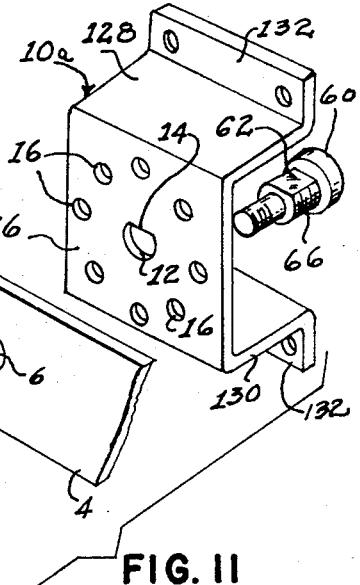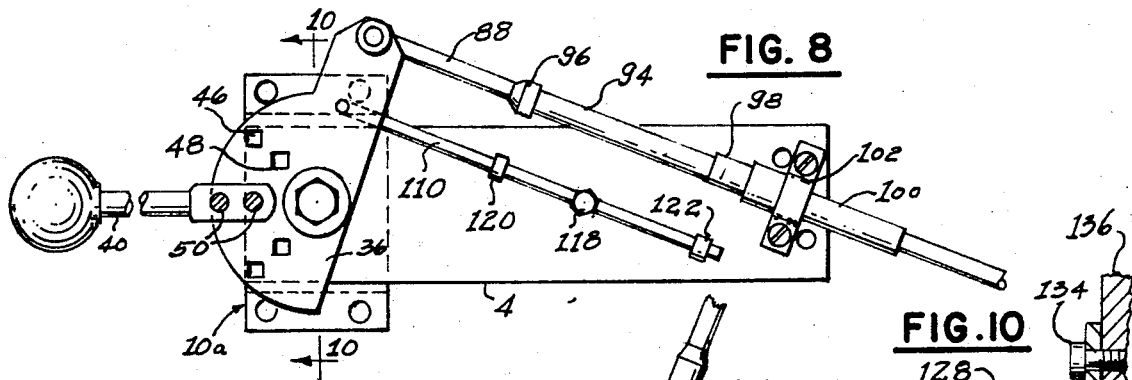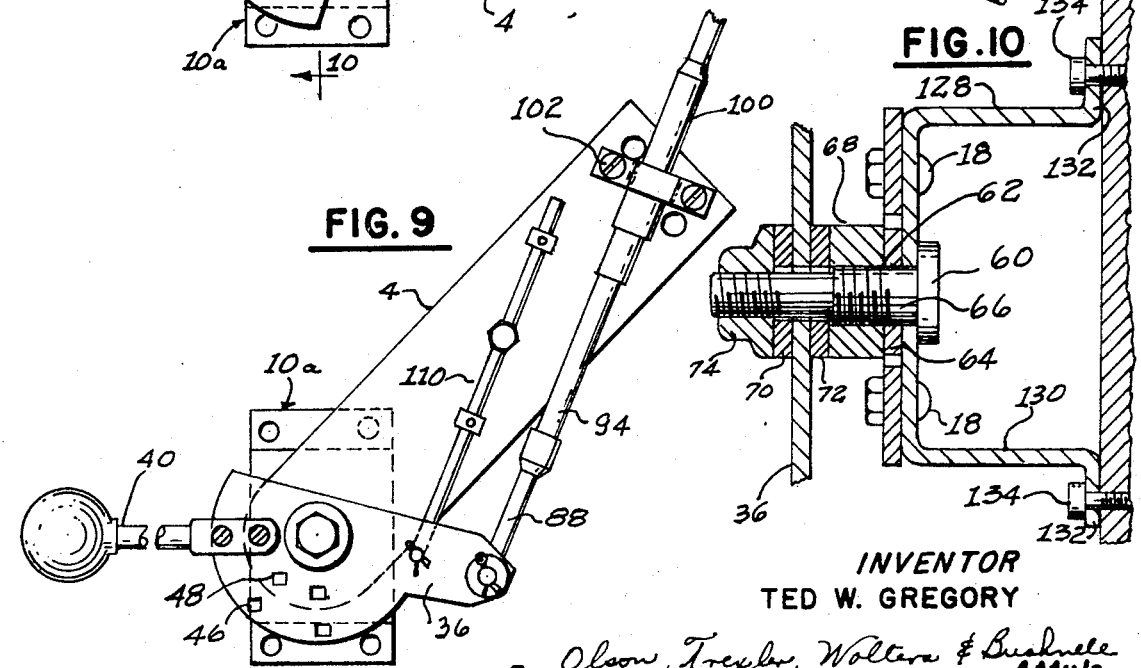

CONTROL UNIT

BACKGROUND OF THE INVENTION

This invention relates to improvements in lever operated mechanical control units.

Lever operated control units of the foregoing type generally include a mechanism that shifts the rod or core of a sheathed cable for purposes of remote actuation of a mechanical device. Such units are used for a wide variety of purposes including throttle control, transmission control and clutch control for farm vehicles, marine power plants, to name but a few. Because of the wide uses to which the control units are put, it is desirable that these units have a wide range of adjustment. Prior units have sometimes lacked the desired adjustment and thus have had limited application. While some units may be factory adjusted upon assembly, these units have sometimes lacked a sufficient degree of adjustability in the field.

In heavy duty control units it is common to use castings for certain of the parts, such as brackets and the like in order to give the units the requisite degree of ruggedness. However, castings significantly increase the cost of the unit.

OBJECTS AND SUMMARY OF THE INVENTION

It is an object of the present invention to provide a lever operated control unit having a wide range of adjustment so as to be capable of use with many types of equipment.

It is a further object of the present invention to provide a control unit of the type stated in which the adjustments can be readily made at the equipment site, thereby enhancing the utility of the unit.

It is another object of the present invention to provide a lever operated control unit of the type stated in which principal parts thereof, such as bracket members, the lever crank etc. are fabricated of heavy gauge sheet metal stampings, thereby reducing the cost of the unit but without impairing its ruggedness or heavy duty capabilities.

It is still another object of the present invention to provide a control unit of the type stated in which an auxiliary rod having adjustable stops and cooperable with an abutment on the control bracket is used to set the stroke or travel of the cable rod, thereby eliminating the use of stops on the cable rod proper and also providing a positive stop in each direction, thereby preventing overload on the control cable.

In accordance with the foregoing objects the control unit of the present invention comprises a first or control bracket, a lever crank having a lever rigidly connected thereto, the lever crank being mounted for pivotal movement relative to the first bracket, a second or lever bracket, an arrangement for adjustably mounting the lever bracket on the control bracket in selected positions of orientation about the pivot axis of the lever crank, and attaching means, such as a clamp, mounted on the lever crank remote from its pivot axis for retaining the core of the cable, and a clamping means on the control bracket for gripping the sheath of the cable but permitting axial movement of the core.

In an embodiment of the invention, there may be three hundred and sixty degrees of adjustability of one bracket relative to the other. In addition, the lever may be adjustably mounted in selected positions on the lever crank radiating outwardly from the axis of rotation of the lever crank.

The attainment of the above and further objects of the present invention will be apparent from the following detailed description taken in conjunction with the accompanying drawings forming a part thereof.

BRIEF DESCRIPTION OF THE FIGURES

In the drawings:

FIG. 1 is a side elevational view of a control unit constructed in accordance with and embodying the present invention;

FIG. 2 is a top plan view of the structure of FIG. 1;

FIGS. 3 and 4 are fragmentary sectional views, on an enlarged scale, taken along lines 3—3 and 4—4 of FIG. 1;

FIG. 5 is an exploded perspective view of the control unit of FIGS. 1 and 2;

FIG. 6 is a fragmentary sectional view, on an enlarged scale, taken along lines 6—6 of FIG. 1;

FIG. 7 is a side elevational view of the control unit of FIG. 1 but with the parts in different positions of adjustment;

FIG. 8 is a side elevational view of the control unit in a further position of adjustment and utilizing a modified form of lever bracket;

FIG. 9 is a side elevational view of the structure of FIG. 8 but showing a further position of adjustment;

FIG. 10 is a fragmentary sectional view, on an enlarged scale, taken along lines 10—10 of FIG. 8; and FIG. 11 is an exploded fragmentary perspective view of the structure of FIG. 10.

DETAILED DESCRIPTION

Referring now in more detail and by reference characters to the drawing, 2 designates a control unit comprising an elongated generally rectangular first or control bracket 4 that is formed of a heavy gauge sheet metal stamping and having a hole 6 adjacent to one end thereof. Radially outwardly of the hole 6 are additional and somewhat smaller holes 8, 8 (FIG. 5) the centers of which are on a line passing through the center of the hole 6 and equally spaced from such center. Provided for mounting on the bracket 4 is a second or lever bracket 10 also formed of a heavy gauge sheet metal stamping and having at one end thereof a hole 12 one edge of which has a flat 14 (FIG. 5). Also formed in the bracket 10 is a series of holes 16 that are located on a circle that is centered on the center of the arcuate portion of the hole 12. Two opposed holes 16 are spaced apart the same as the spacing of the holes 8, 8, and the holes 8, 8 and a pair of opposed holes 16, 16 are adapted to receive fasteners such as screw and nut assemblies 18, 18. By reason thereof, the brackets 4, 10 may be secured together in selected positions of orientation about the axis of the hole 6.

The end of the bracket 10 that is opposite to the series of holes 16 is angularly turned to form two ears 20, 20 that abut a face place 22 having an elongated slot 24. Screw and nut assemblies 26, 26 may be used to attach the face plate 22 to the ears 20, 20. The face plate 22 also has four corner holes 28 for receiving screw and nut assemblies 30 and by which the face plate and hence the unit 2 may be mounted over an openings in a support or panel 32, as shown in FIG. 1. In the form of the invention herein shown, it will be seen that the bracket 4 may be adjustably positioned relative to the bracket 10 through a range of one hundred and eighty degrees. Thus, the bracket 4 may be positioned either clockwise 90° or counterclockwise ninety degrees from the position shown in FIG. 1 or the bracket 4 may lie in a number of angular positions intermediate thereof, as determined by the number of holes 16.

A lever crank 36 is pivotally mounted by movement relative to the brackets 4, 10 about the axis of the hole 6. This lever crank or quadrant control may also be a sheet metal stamping. A lever 38 has an elongated shank 40 that projects loosely through the slot 24 and at its free end has a generally spherical knob 42 in screw threaded engagement therewith. The attached end of the lever shank 40 is flattened somewhat as at 44 for flush fitting engagement with the face of the lever crank 36. In order to secure the lever 38 to the lever crank 36, the latter has openings lying on lines radiating substantially from the pivot axis of the lever crank. In the form of the invention herein shown, there are three sets of holes, there being two holes 46, 48 in each set and with the holes of each set being arcuately offset from the holes of an adjacent set. Obviously, however, more than three sets of holes may be punched out of the lever crank 36. Fasteners in the form of screw and nut assemblies 50, 50 project through the flat 44 and through a selected set of holes 46, 48. For appearance and for avoiding obstruction between the lever crank 36 and the face plate 22 the lever crank 36 may have an arcuate edge 52 outwardly of the groups of holes 46, 48, the arcuate edge 52 terminating in opposed flat edges 54, 56 and defining the sides of an arm 58.

A bolt 60 upon which the lever crank 36 pivots passes through the holes 6, 12 and a center hole 61 (FIGS. 5 and 11) in the crank 36. The bolt 60 has a flat 62 for mating engagement with the flat 14. A split lock washer 64 surrounds the bolt 60 and is disposed in the hole 6. The bolt 60 has a large diameter thread 66 for threadedly receiving a spacer nut 68 that abuts the split lock washer 64. The bolt 60 is diametrally reduced adjacent to the thread 66 for receiving plastic anti-friction washers 70, 72 which are disposed on opposite sides of the lever crank 36 and are flush thereagainst. A flanged lock nut 74 is threaded onto the bolt 60 and presses against the axially outer washer 70. It will be seen, therefore, that the lever crank 36 pivots about the central axis of the bolt 60 with the plastic washers 70, 72 providing bearings that frictionally grip the lever crank 36 and yet permit the lever crank 36 to be rotated without requiring excessive forces to be applied thereto.

Adjacent to its free end, the arm 58 is provided with spaced apart apertures 76, 78 (FIGS. 5 and 11) for selectively receiving a fitting 80 (FIGS. 4 and 6) that includes a pin portion 82 that is swivelly mounted in the arm 58 and is retained against axial withdrawal from the arm 58 by a cotter pin 84. The pivot fitting 80 has a threaded diametral hole 86 for receiving the threaded end of a wire rod core 88 of a cable that includes a sheath generally designated at 90. A lock nut 92 threads onto the threaded end of the core 88, as shown in FIG. 4. In the form of the invention herein shown, the sheath 90 may include rubber bushings 96, 98, a metal tube 94 therebetween, and a metal oversheath 100 telescoped with the rubber bushing 98. The stretch of the sheath beyond the oversheath 100 may be rubber, plastic, or other flexible material. It should be noted, however, that the core and sheath of the herein described cable is by way of illustration as other forms of cable may be used with the control unit of the present invention.

The sheath 90 is secured to one end of the control bracket 4 by a clamp 102 that has lateral flanges for receiving bolt and nut assemblies 104, 104 that pass through holes in a mounting plate 106 and also holes 107 (FIG. 7) in the control bracket 4 whereby the clamp 102 is disposed generally at an angle to the longitudinal center line of the bracket 4. An additional set of holes shown at 108 are provided in the bracket 4 whereby the clamp 102 may be disposed at a like but opposite angle to the longitudinal center line of the bracket 4. The clamp 102 may be disposed over any suitable part of the sheath 90, for instance over the metal portion 100.

For purposes of limiting the stroke of the rod or core 88, there is provided a rod 110 one end of which has a right angle bend 112 for pivotal fitting in a hole 114 that is radially outwardly of the pivot axis of the lever crank and radially inwardly of the pivot fitting 80. The bend 112 is retained against withdrawal from the hole 114 by a cotter pin 116. Mounted in the control bracket 4 substantially at the longitudinal center line thereof and spaced from the hole 6 is a fitting 118 that is pivotally connected to the bracket 4 and has a transverse bore for slidably receiving the rod 110. The fitting 118 may be retained by a cotter pin 119 (FIG. 2). On opposite sides of the pivot fitting 118 the rod 110 has stop collars, 120, 122 mounted thereon. The position of each stop collar is adjustable in a conventional manner (as by set screws therein) so that at the limits of travel of the lever crank 36, one or the other of the stop collars, 120, 122 will abut the pivot fitting 118. Thus, positive stops are provided for the throw of the lever crank and lever independently of the cable so that the cable does not have to withstand all of the force that may be put on the lever as is the case where the core of the cable has to withstand all of the force.

FIG. 7 shows another position of adjustment of the control unit 2. It will be noted that the flat portion 44 of the lever shank 40 is attached to a different set of holes 46 than in the case of FIG. 1. Furthermore, it will be noted that the rod 110 and cable project generally oppositely to the arrangement shown in FIG. 1, namely generally from the edge 54 rather than from the edge 56 of the lever crank 36. Moreover, the clamp 102 has the bolt and nut assemblies 104, 104 thereof secured in the optional holes 108, 108 rather than in the holes 107, 107. In a typically "neutral" or mid-stroke condition, the lever 38 of FIG. 7 is more or less at right angles to the lever at mid-stroke or "neutral" in FIG. 1 assuming the same position in each instance for the bracket 4.

FIGS. 8-11 show a modified form of the invention in which the same reference characters indicate the same parts as are present in the form of the invention shown in FIGS. 1-7. The form shown in FIGS. 8-10 differs from that shown in FIGS. 1-7 in that the second or lever bracket 10a (also used in FIG. 7) is a U-shaped member with a bight 126 that contains the circularly disposed holes 16 and the hole 12 that are present in the lever bracket 10. The bracket 10a has spaced parallel legs 128, 130 that terminate in lateral flanges 132, 132 having holes for receiving screws 134 (FIG. 10) by which the bracket 10a and thus the entire control unit 2 may be mounted on a support 136. When utilizing the bracket 10a, the control bracket 4 is capable of 360° adjustment about the axis of the pivot bolt 60, the exact number of fixed positions being determined by the number of holes 16.

FIG. 8 shows one arrangement utilizing the U-shaped bracket 10a. FIG. 9 shows another arrangement in which the control bracket 4 is offset from that shown in FIG. 8 by 45° and wherein the lever shank 40 is secured to a different set of holes 46, 48 than in FIG. 8.

The invention is claimed as follows:

1. A lever operated control unit for actuation of the core of a cable having a sheath over the core having a first bracket, a lever crank having a lever connected thereto, said lever crank being mounted for pivotal movement relative to said first bracket, a second bracket, means for mounting the lever rigidly on the crank in any one of a number of selected positions radiating outwardly from the pivot axis of the lever crank to position selectively the lever relative to the cable direction, said lever crank having a portion extending therefrom a greater distance from the pivot axis thereof than the lever mounting means, attaching means mounted on the extending portion of said lever crank remote from the pivot axis of said lever crank and connected to a cable core which is axially slidable in said sheath, clamping means on said first bracket remote from said attaching means for gripping the sheath of the cable but permitting axial movement of the core therein, and means for mounting said first bracket on said second bracket in any one of a number of selected positions of orientation about said pivot axis whereby to facilitate selection of the relative positioning of the lever crank and the direction of the cable.

2. A control unit according to claim 1 in which said lever crank has openings lying substantially on lines radiating from said pivot axis, and fastener means projecting through a plurality of said openings and through said lever.

3. A control unit according to claim 1 including plastic washers on opposite sides of said lever crank and bearing thereagainst.

4. A control unit for actuation of the core of a cable having a sheath over a core, said unit comprising bracket means, actuating means movable in opposite directions on said bracket means for push-pull engagement with said core to move the same axially in opposite directions, means on said bracket means for clamping said sheath but permitting axial movement of said core, and stop means remote from said cable for limiting the displacement of said actuating means in each of said opposite directions; said stop means including a member independent of the core and connected to the actuating means for movement therewith, abutment means on the bracket means separate from the sheath clamping means, and spaced stop-forming elements mounted on said independent member and selectively engageable with said abutment means.

5. A control unit according to claim 4 in which said actuating means comprises a lever crank rotatably mounted on said bracket means, said independent member is a rod pivotally connected to said lever crank offset from the means for engagement with said core, said stop-forming elements are collars adjustably mounted on said rod, and said abutment means is a fitting pivotally mounted on said bracket means and through which said rod projects and with the collars being on opposite sides of said fitting.

6. A control unit according to claim 5 in which said bracket means comprises first and second brackets, and means securing said brackets together in selected positions of orientation about the axis of rotation of said lever crank.

7. A control unit according to claim 6 including a lever, and means for attaching said lever in selected positions on said lever crank, said selected positions being such that in each said position the lever extends generally radially of the axis of rotation of said lever crank.

8. A control unit according to claim 1 in which said brackets are of sheet metal stampings.

9. A control unit according to claim 1 in which said lever crank is a sheet metal stamping.

* * * * *